United States Patent [19]

Prokop et al.

[11] 4,433,762

[45] Feb. 28, 1984

[54] OPPOSED REACTION TRANSMISSION BRAKE

[75] Inventors: Josef F. Prokop, Downers Grove; Robert R. Coons, Hinsdale; Richard H. Mylander, Glen Ellyn, all of Ill.

[73] Assignee: International Harvester Co., Chicago, Ill.

[21] Appl. No.: 288,623

[22] Filed: Jul. 30, 1981

[51] Int. Cl.³ ............................................. B60K 41/28
[52] U.S. Cl. ...................................... 192/4 A; 192/9; 188/72.5
[58] Field of Search .................. 192/3.58, 9, 4 A, 4 B, 192/4 R, 4 C, 0.062, 0.09, 13 A; 74/411.5; 188/368, 72.5, 71.3

[56] References Cited

U.S. PATENT DOCUMENTS

| | | | |
|---|---|---|---|
| 2,595,859 | 5/1952 | Lambert et al. | 188/71.3 |
| 2,863,326 | 12/1958 | Maurice et al. | 192/9 X |
| 2,904,145 | 9/1959 | Sheppard | 192/4 A |
| 3,670,596 | 6/1972 | Hause | 188/72.5 |
| 4,298,109 | 11/1981 | Dorpmund et al. | 192/4 A |

*Primary Examiner*—George H. Krizmanich
*Attorney, Agent, or Firm*—Boris Parad; F. David Aubuchon

[57] ABSTRACT

A tractor vehicle transmission is provided with a two piston brake where each piston operates in opposite directions. A pair of gears are spaced apart and the brake resides between them. Thus upon actualization the brake will contact each gear causing retardation of the gear, its attendant shaft, and the transmission as a whole allowing simpler shifting of the transmission.

18 Claims, 1 Drawing Figure

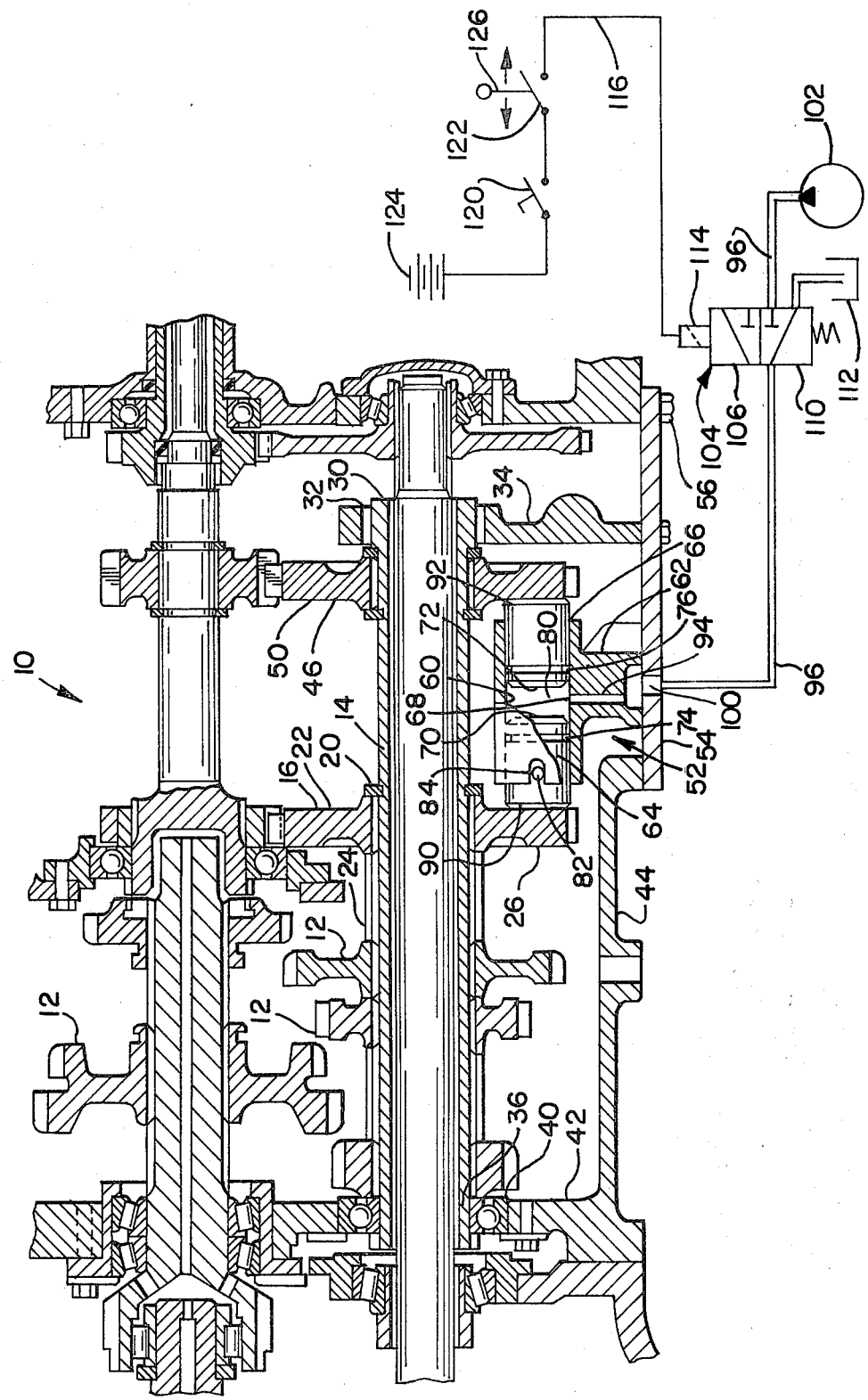

OPPOSED REACTION TRANSMISSION BRAKE

BACKGROUND OF THE INVENTION

This invention has to deal with spur gear transmissions used in tractor vehicles. More specifically, a gear brake is provided that is electro-hydraulically actuated to check the rotational speed of at least a single gear.

DESCRIPTION OF THE PRIOR ART

In the agricultural transmission wherein this invention would be embodied it has been known to control gear speed—to facilitate smooth gear changes—through the use of a mechanical linkage lever mounted frictional element adjusted to move responsive to clutch displacement against an adjacent gear to slow the rotation of the gear. The bell crank lever arrangement of current production transmissions was mounted on a shaft fastened to the inside of the transmission access plate and would thus require significant reinforcement to prevent undesirable torque transfer from dislodging the shaft from the transmission cover to which it was attached. The present invention eliminates the torque transfer to the transmission access plate by redirecting its forces in a longitudinal direction and having each piston brake working in opposition to its counterpart.

Other transmissions have been provided with synchronizers that control the rotational speed, either increasing, or decreasing the gear's speed, to enable a smooth engagement. Synchronizers are prone to wear and thus decrease in effectiveness while also being expensive and cumbersome.

Using the prior art lever mounted drag brake, transmission shifts in the range section of a transmission were slow. The instant invention drastically reduces this shift time and provides for shifts without gear clashing.

In addition to the slow shifting action the prior art drag brake could only generate a holding force that was much less than the holding force generated by the instant invention.

The dual piston opposed reaction brake is hydraulically operated through a solenoid operated valve controlling the flow of fluid to the brake. The solenoid will allow flow only when a pair of electrical switches are closed—one switch being associated with the tractor clutch pedal and the second switch associated with the neutral position of the range lever of the tractor transmission. When both are closed the solenoid will be energized allowing hydraulic fluid to pass through the solenoid operated valve and pressurize the transmission hydraulic brake. When either of the switches are open the transmission brake will be released as fluid will flow back through the solenoid operated two position valve to the hydraulic system sump.

Since the dual piston opposed reaction brake requires the closing of these two switches the brake can never be operated by depressing the clutch only—such as for quick stops on the road. This brake is a true transmission brake only—unlike previous contemporary tractor transmissions. In the prior transmissions every time the clutch pedal was depressed the brake would be engaged. This resulted in the transmission brake being used as a vehicle brake or, in combination with the foot brakes, to stop or slow down the tractor. Of course this caused undesirable brake lining wear and more frequent adjustments.

The instant invention, being mounted to the inside surface of an easily removed transmission access plate, has been fitted into a transmission in a vacant space that does not required transmission redesign to accompany it. Also the brake is easy to manufacture and much less expensive than synchronizers.

Thus it is amongst the objects of this invention to provide an opposed reaction transmission brake that can be mounted to a transmission access plate without extensive modifications or "beefing up" of the plate.

It is also an object to provide a transmission brake that will effectively reduce the rotational speed of a great train in an agricultural transmission when the brake is engaged.

It is also an object to provide for a brake that does not require periodic adjustments.

These and other objects and advantages of this invention can be seen through the examination of the drawing FIGURE and a perusal of the following text.

IN THE DRAWING FIGURE

The FIGURE is a sectional view of a portion of an agricultural transmission showing the invention.

The transmission of a preferred embodiment has a speed transmission section and a range transmission section as is well known in the art. The range section provides a plurality of ranges such as high, low and neutral that may be engaged and through which all four (for example) transmission speeds are driven.

The agricultural transmission generally 10 includes a plurality of sliding gears such as 12 carried on shafts such as 14 as well as a first constant mesh gear 16 in the speed portion of the transmission. The first constant mesh gear 16 would typically be splined to shaft 14 and prevented from longitudinal movement on the shaft by a collar 20 on its face side 22 and a spacer 24 on its obverse side 26. The shaft 14 is supported at a first end 30 thereof in a bearing 32 carried by a stantion 34 and at a second end 36 thereof by a second bearing 40 supported in the rear wall portion 42 of the speed transmission housing. Both the bearing supports 34 and 42 are supported by the substantial transmission case 44.

Both the first constant mesh gear 16 and a second constant mesh gear 46, in a preferred embodiment a torque amplifier driven gear, having a face 50, are coupled to the shaft 14 for rotation therewith whenever any shaft or gear in the transmission is in motion. The dual piston opposed reaction brake generally 52 is mounted between first and second gears 16 and 46 respectively through its attachment to the inside of a transmission access plate 54. The transmission access plate 54 is fastened, for instance by bolts such as 56 to the transmission housing. The access plate 54 is generally a lighter weight panel than the walls of the transmission housing.

The brake generally 52 is a casting or fabrication having a longitudinal piston bore 60 extending through the housing above a pedestal portion 62 of the brake. The bore 60 is provided with a hydraulic fluid access port 68 in a central portion thereof. The piston bore 60 houses first and second brake pistons 64 and 66 respectively which are mounted for horizontal movement through the piston bore 60. The pistons 64 and 66 are arranged back-to-back so seal ends 70 and 72 face each other. Elastomeric seals 74 and 76 reside in grooves in the piston and will restrain hydraulic actuation fluid in chamber 80.

The pistons 64 and 66 are each provided with an alignment pin such as 82 that will normally be restrained in cutout 84 to prevent the piston from rotating in the piston bore 60.

The face portions 90 and 92 of each piston 64 and 66 have frictional material bonded thereto so that contacts between the pistons and the adjacent gears—upon brake application—will not be direct metal to metal contact. The frictional material will be a material that improves braking effectiveness while having long life properties for extended service in this environment.

It is significant to note that the brake of the instant invention operates in a fluid environment, i.e., it is constantly awash in transmission fluid, thus could characteristically be considered a "wet brake".

The pedestal portion 62 will be fastened as by bolts (not shown) to the inside surface of the transmission access plate 54. The pedestal is provided with a fluid pasage 94 connecting the fluid chamber 80 of the dual piston opposed reaction brake 54 to a supply conduit 96. Access port 100 is provided to the transmission access plate 54 for allowing the passage of fluid from the supply conduit 96 to the fluid passage 94.

Supply conduit 96 is a hydraulic fluid supply line for delivering fluid under pressure from a source of fluid pressure, here shown as pump 102, but more typically not requiring its own pump but rather plumbed into the tractor hydraulic system. The supply line 96 is interrupted by a solenoid operated two position valve generally 104 having a first section 106 that allows fluid delivery from the source of fluid 102 through supply line 96 to the dual piston opposed reaction brake generally 52. A second section 110 will cut off the flow to the brake 52 when the solenoid operated valve 104 is in a deenergized state while allowing fluid to escape from the brake fluid chamber 80 through the second section 110 of the valve to a reservoir 112.

The solenoid 114 is energized through conduit 116 when a clutch pedal foot operated switch 120 and a range lever actuated switch 122 (wired in series) are both closed to complete the circuit from the source 124 to the solenoid 104. The range shifting lever 126 must be approaching neutral to close the switch 122 while the clutch pedal has to be fully depressed to close its linked switch. The range shift lever switch 126 is cam actuated so that the switch is closed from the time the lever is about to enter the neutral position, for example a distance of lever travel of about one inch, to the time the lever leaves the neutral area again for a distance of about one inch.

In operation the pistons 64 and 66 of the brake 52 will be urged outward in the longitudinal piston bore 60 when there is fluid pressure in the fluid chamber 80. There will be fluid pressure in the chamber when both the clutch pedal operated foot switch 120 and the neutral position actuated range lever switch 122 are closed. The switches being closed, will then actuate the solenoid 114 to position the two position valve so that the first section 106 of the valve will be arranged to allow fluid passage through supply conduit 96 from the source of fluid 102 to the fluid chamber 80.

As the pistons are urged outwardly through the bore 60 the frictional surface faced portions 90 and 92 will be pressed against the faces 22 and 50 of respective first and second constant mesh gears 16 and 46 thereby retarding the motion of these gears and of the shafts of the transmission. The retarding motion is a smooth braking action allowing range transmission shifts to be made rapidly.

After the transmission has been braked and while the clutch pedal is still fully depressed the operator will move the range shift lever from the neutral position to the appropriate desired gear and after the lever passes more than about an inch out of the neutral position the switch opens and transmission braking action ceases which prevents the transmission from being "locked" with the gears stopped "tooth to tooth" thus not allowing a shift to be completed.

The transmission brake is actuated only for the length of time necessary for the shift of the range transmission, the brake is timed to release at the critical point at which the range shift lever starts to shift the internal gears.

It will be understood that both pistons will move laterally balancing the loads on the brake assembly so they are equalized such that the piston housing is not subjected to debilitating torque loads. The dual piston also provides automatic compensation for wear and freedom from linkage wear associated free play.

Piston retraction is not a problem with this device. Since the brake is generally submerged in a bath of transmission oil the face surfaces of the gears will have an oil film of nominal thickness. This oil film as well as any runout of the face surfaces of the gears will cause the piston to be retracted without the need of ancillary retraction devices.

Thus it can be seen that there has been provided a transmission brake having longitudinally displaced pistons easily accessible through an access plate of a transmission that fully meets the objects and advantages set forth above. In the appended claims the inventors seek to secure protection for their idea and those nuances of design as fall within the spirit and scope of the appended claims.

What is claimed is:

1. In a transmission having a housing containing a rotatable shaft to which a plurality of constant mesh gears are mounted, a source of fluid pressure and a source of electrical energy, the improvement comprising:

a transmission access plate having a fluid access port;
   a dual piston opposed reaction brake mounted to the interior surface of said transmission access plate between a pair of said constant mesh gears;
   a solenoid operated two position valve having a supply conduit connecting it hydraulically with said source of fluid pressure and said dual piston opposed reaction brake and an electrical circuit connecting it electrically to said source of electrical energy;
   a clutch pedal foot operated switch in said electrical circuit;
   a lever actuated switch in series with said clutch pedal foot operated switch in said electrical circuit whereby said dual piston opposed reaction brake will be actuated hydraulically upon the simultaneous closing of said clutch pedal foot operated switch and said lever actuated switch.

2. The invention in accordance with claim 1 wherein said dual piston opposed reaction brake comprises:
   a pedestal portion for supporting said brake on said inside surface of said transmission access plate;
   a longitudinal piston bore supported on said pedestal, said longitudinal piston bore being an open ended cylinder and having a hydraulic fluid access port in a central portion thereof;

first and second pistons, having seal ends, carried seal end-to-seal end in said longitudinal piston bore, each of said pistons provided with a face portion for contacting said constant mesh gears when said dual piston opposed reaction brake is actuated, each of said pistons also having an elastomeric seal circumferentially carried at said seal end of said piston;

a fluid chamber defined by said longitudinal piston bore and said seal end portions of said pistons, said fluid chamber communicating with said hydraulic fluid access port.

3. The invention in accordance with claim 2 wherein said hydraulic fluid access port is hydraulically connected to a fluid passage provided through said pedestal of said dual piston opposed reaction brake, said fluid passage extending to said access port of said transmission access plate.

4. The invention in accordance with claim 3 wherein said longitudinal piston bore is provided with a cutout at each end thereof and each of said pistons is provided with an alignment pin extending from the side of each of said pistons for reciprocal motion in said cutouts whereby rotation of said piston in said longitudinal piston bore will be controlled.

5. The invention in accordance with claim 3 wherein said solenoid operated valve is a two position valve having a first section allowing flow from said source of fluid pressure to said dual piston opposed reaction brake when said solenoid is energized, and being spring urged to a second section of said solenoid operated valve allowing interruption of fluid flow from said source when said solenoid is deenergized.

6. The invention in accordance with claim 5 wherein said plurality of constant mesh gears include:
    a first constant mesh gear having a face for contacting said first piston; and
    a second constant mesh gear, being a torque amplifier driven gear, having a face for contacting said second piston;
    said first and said second constant mesh gears carried on a common shaft and spaced apart sufficient distance to allow said dual piston opposed reaction brake to be mounted between them while having said gear faces within the range of deployment of said piston in said longitudinal piston bore.

7. The invention in accordance with claim 6 wherein said clutch pedal foot operated switch must be fully depressed to close the switch contact.

8. The invention in accordance with claim 7 wherein said lever actuated switch will be closed when said lever is in a neutral position.

9. The invention in accordance with claim 8 wherein said lever actuated switch will be closed when said lever is in a neutral position and within at least one inch of said neutral position.

10. The invention in accordance with claim 9 wherein said pistons upon actuation will contact said gears and will cause motion of said gears to be retarded retarding motion of said shaft on which said gears are carried.

11. In a transmission having a housing containing a rotatable shaft to which a plurality of constant mesh gears are mounted, a source of fluid pressure and a source of electrical energy, the improvement comprising:
    a transmission access plate having a fluid access port, said plate fixedly mounted to said transmission housing;
    a dual piston opposed reaction brake mounted to the interior surface of said transmission access plate between face surfaces of a pair of constant mesh gears, said dual piston opposed reaction brake having a pedestal portion for supporting said brake on said inside surface of transmission access plate, a longitudinal piston bore supported on said pedestal portion, said longitudinal piston bore being an open ended cylinder and having a hydraulic fluid access port in a central portion thereof, first and second pistons, having seal ends, carried seal-end-to seal end in said longitudinal bore, a fluid chamber defined by said longitudinal piston bore and said seal end portions of said pistons, said fluid chamber communicating with said hydraulic fluid access port;
    a solenoid operated two position valve having a supply conduit connecting it hydraulically with said source of fluid pressure and said dual piston opposed reaction brake and an electrical circuit connecting it electrically to said source of electrical energy, said solenoid operated valve being a two positioned valve having a first section allowing flow from said source of fluid pressure to said dual piston opposed reaction brake when said solenoid is energized, and being spring urged to a second section of said solenoid operated valve allowing interruption of fluid flow from said source when said solenoid is deenergized;
    a clutch pedal foot operated switch closed upon being fully depressed in said electrical circuit;
    a lever actuated switch in series with said clutch pedal foot operated switch in said electrical circuit whereby said dual piston opposed reaction brake will be actuated hydraulically upon simultaneous closing of said clutch pedal foot operated switch and said lever actuated switch.

12. The invention in accordance with claim 11 wherein said first and second pistons are provided with face portions for contacting said constant mesh gears when said dual piston opposed reaction brake is actuated, each of said pistons also having an elastomeric seal circumferentially carried at said seal end of said piston.

13. The invention in accordance with claim 12 wherein said hydraulic fluid access port is hydraulically connected to a fluid passage through said pedestal of said dual piston opposed reaction brake said fluid passage extending to said access port of said transmission access plate.

14. The invention in accordance with claim 13 wherein said longitudinal piston bore is provided with a cutout at each end thereof and each of said pistons is provided with an alignment pin extending from the side of each of said pistons for reciprocal motion in said cutouts whereby rotation of said pistons in said longitudinal piston bore will be controlled.

15. The invention in accordance with claim 14 wherein said plurality of constant mesh gears include;
    a first constant mesh gear having a face for contacting said first piston; and
    a second constant mesh gear, being a torque amplifier driven gear, having a face for contacting said second piston;
    said first and said second constant mesh gears carried on a common shaft and spaced apart sufficient distance to allow said dual piston opposed reaction brake to be mounted between them while having said gear faces witin the range of deployment of said piston in said longitudinal piston bore.

16. The invention in accordance with claim 15 wherein said lever actuated switch will be closed when said lever is in a neutral position.

17. The invention in accordance with claim 16 wherein said lever actuated switch will be closed when said lever is in a neutral position and within at least one inch of said neutral position.

18. The invention in accordance with claim 17 wherein said pistons, upon actuation, will contact said gears and will cause motion of said gears to be retarded, retarding motion of said shaft on which said gears are carried.

* * * * *